United States Patent
Bahirat

(10) Patent No.: US 10,146,292 B2
(45) Date of Patent: *Dec. 4, 2018

(54) POWER MANAGEMENT

(71) Applicant: Micron Technology, Inc., Boise, ID (US)

(72) Inventor: Shirish D. Bahirat, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 130 days.

This patent is subject to a terminal disclaimer.

(21) Appl. No.: 15/202,714

(22) Filed: Jul. 6, 2016

(65) Prior Publication Data

US 2016/0342193 A1 Nov. 24, 2016

Related U.S. Application Data

(63) Continuation of application No. 13/590,710, filed on Aug. 21, 2012, now Pat. No. 9,405,355.

(51) Int. Cl.
*G06F 1/00* (2006.01)
*G06F 1/32* (2006.01)
*G06F 3/06* (2006.01)

(52) U.S. Cl.
CPC ........... *G06F 1/3253* (2013.01); *G06F 1/324* (2013.01); *G06F 3/0625* (2013.01); *G06F 3/0647* (2013.01); *G06F 3/0683* (2013.01); *Y02D 10/126* (2018.01); *Y02D 10/151* (2018.01)

(58) Field of Classification Search
CPC .... G06F 1/3203; G06F 1/324; Y02B 60/1235
USPC .............................. 711/103; 710/33; 370/230
See application file for complete search history.

(56) References Cited

U.S. PATENT DOCUMENTS

| | | | |
|---|---|---|---|
| 6,473,814 B1* | 10/2002 | Lyons | G06F 13/28 710/33 |
| 7,889,544 B2 | 2/2011 | Chow et al. | |
| 7,970,978 B2 | 6/2011 | Luo et al. | |
| 8,037,234 B2 | 10/2011 | Yu et al. | |
| 8,130,010 B2 | 3/2012 | Oh et al. | |
| 2006/0161745 A1 | 7/2006 | Lee et al. | |
| 2007/0162654 A1 | 7/2007 | Miwa | |
| 2008/0242369 A1 | 10/2008 | Kazuta et al. | |
| 2009/0204831 A1 | 8/2009 | Cousson et al. | |
| 2010/0023674 A1 | 1/2010 | Aviles | |
| 2010/0202475 A1 | 8/2010 | Nakazumi | |
| 2010/0238705 A1 | 9/2010 | Kim et al. | |
| 2010/0325349 A1 | 12/2010 | Otsuka | |
| 2011/0179421 A1 | 7/2011 | Gustafsson et al. | |
| 2012/0011301 A1 | 1/2012 | Goss et al. | |
| 2012/0066439 A1* | 3/2012 | Fillingim | G06F 11/3485 711/103 |
| 2013/0023232 A1 | 1/2013 | Mendiola | |
| 2016/0182391 A1* | 6/2016 | Theobald | H04L 12/4641 370/230 |

* cited by examiner

*Primary Examiner* — Aurel Prifti
(74) *Attorney, Agent, or Firm* — Brooks, Cameron & Huebsch, PLLC

(57) ABSTRACT

The present disclosure includes methods and apparatuses for power management. One method includes transferring data between a memory and a controller via an input/output (I/O) bus, and adjusting an amount of power consumed in association with transferring the data by throttling the I/O bus.

19 Claims, 3 Drawing Sheets

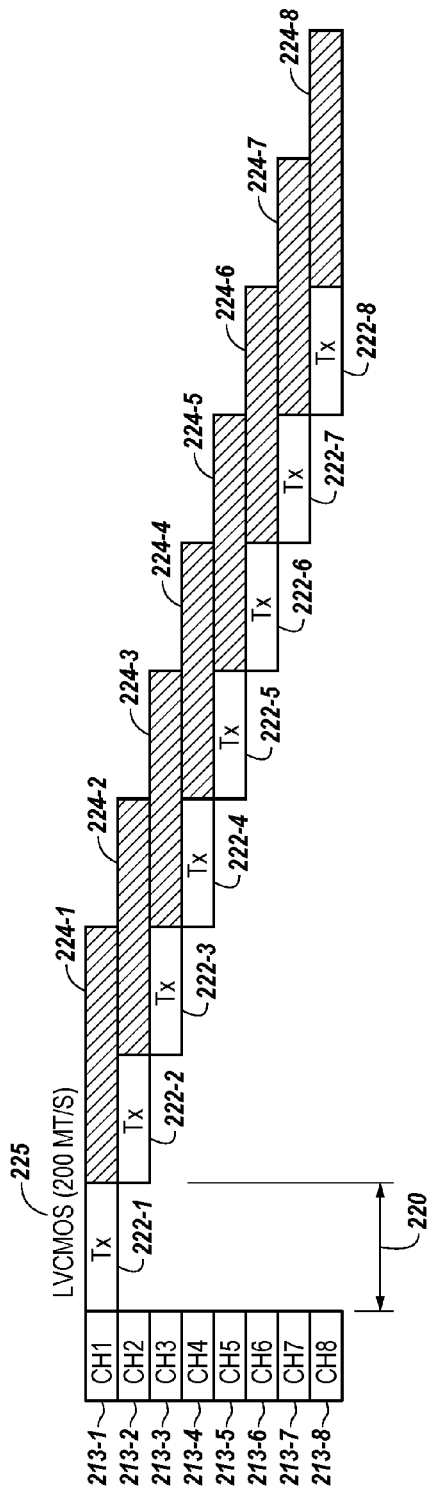
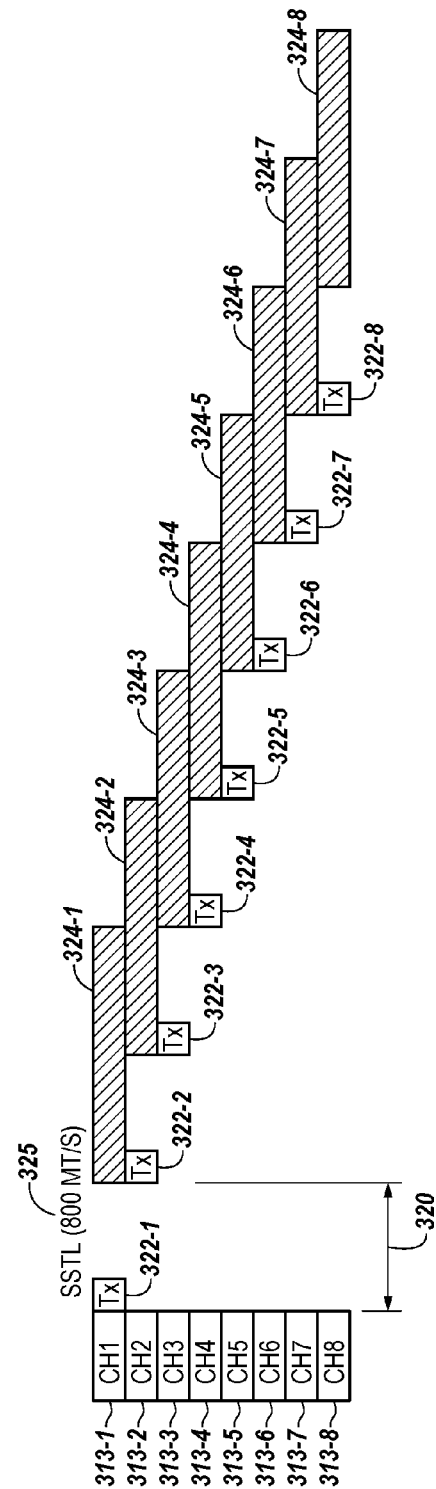

POWER MANAGEMENT

PRIORITY INFORMATION

This application is a Continuation of U.S. application Ser. No. 13/590,710, filed Aug. 21, 2012, the contents of which are included herein by reference.

TECHNICAL FIELD

The present disclosure relates generally to semiconductor memory and methods, and more particularly, to power management.

BACKGROUND

Memory devices are typically provided as internal, semiconductor, integrated circuits in computers or other electronic devices. There are many different types of memory including volatile and non-volatile memory. Volatile memory can require power to maintain its data (e.g., information) and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, static random access memory (SRAM), resistance variable memory, such as phase change random access memory (PCRAM) and resistive random access memory (RRAM), and magnetic random access memory (MRAM), such as spin torque transfer random access memory (STT RAM), among others.

Memory devices can be combined together to form a solid state drive (SSD). A solid state drive can include non-volatile memory such as NAND flash memory and/or NOR flash memory, and/or can include volatile memory such as DRAM, among various other types of non-volatile and volatile memory. Flash memory devices, including floating gate flash devices and charge trap flash (CTF) devices can comprise memory cells having a storage structure (e.g., a floating gate or a charge trapping structure) used to store charge and may be utilized as non-volatile memory for a wide range of electronic applications.

Memory cells can be arranged in an array architecture and can be programmed to a desired state. For instance, electric charge can be placed on or removed from the storage structure (e.g., floating gate) of a memory cell to place the cell into one of a number of data states. As an example, a single level cell (SLC) can be programmed to one of two data states which can represent a stored data unit (e.g., binary units 1 or 0). Various flash memory cells can be programmed to one of more than two data states, which can represent multiple stored data units (e.g., binary units 1111, 0111, 0011, 1011, 1001, 0001, 0101, 1101, 1100, 0100, 0000, 1000, 1010, 0010, 0110, or 1110). Such memory cells may be referred to as multi state cells, multiunit cells, or multilevel cells (MLCs). MLCs can allow the manufacture of higher density memories without increasing the number of memory cells since each cell can represent more than one digit (e.g., more than one bit).

Various apparatuses (e.g., computing systems) can comprise an SSD coupled to a host (e.g., a personal laptop computer, a desktop computer, a digital camera, a mobile telephone, or a memory card reader, among various other types of hosts). Managing the power consumed by such apparatuses can be useful in order to conserve battery capacity, for instance. Current power management techniques include dynamic voltage scaling (DVS) and dynamic frequency scaling (DFS), which may be together referred to as DVFS. Such techniques include throttling (e.g., changing) the operating voltage and/or operating frequency of processing resources (e.g., a number of processors and/or microprocessors) of a host and/or controller in order to operate the apparatus in different modes (e.g., an active mode or an idle mode), which consume different amounts of power.

BRIEF DESCRIPTION OF THE DRAWINGS

FIG. 2 is a timing diagram associated with power management in accordance with a number of embodiments of the present disclosure.

FIG. 3 is a timing diagram associated with power management in accordance with a number of embodiments of the present disclosure.

DETAILED DESCRIPTION

Figure 1:
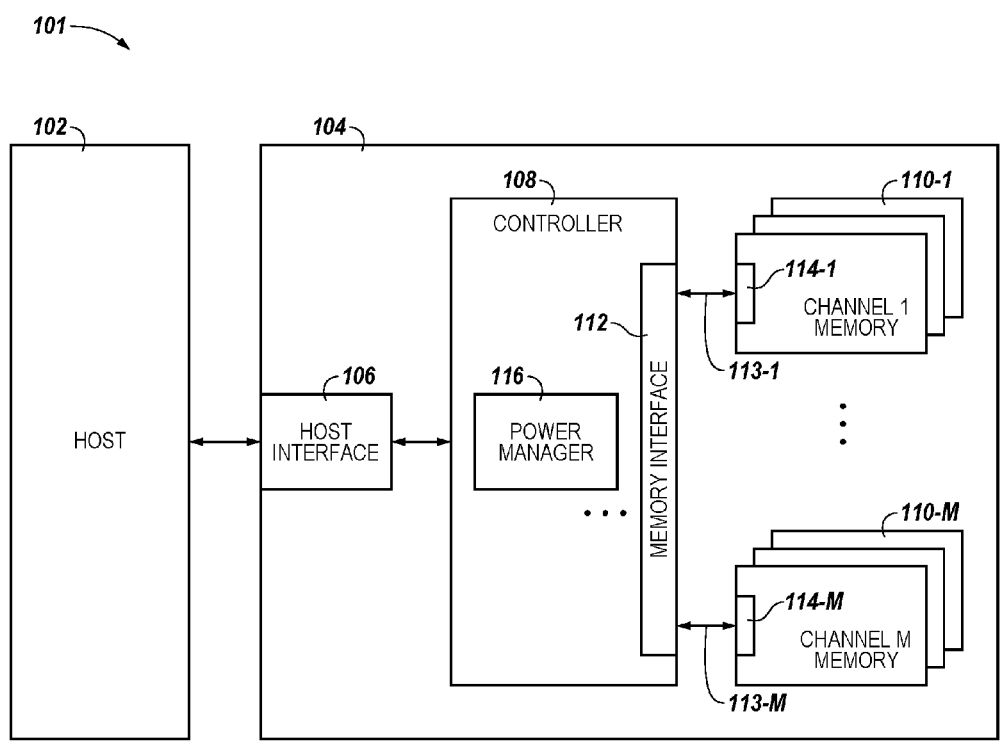
FIG. 1 is a block diagram of an apparatus in the form of a computing system including at least one memory system in accordance a number of embodiments of the present disclosure.

The present disclosure includes methods and apparatuses for power management. One method includes transferring data via an input/output (I/O) bus, and adjusting an amount of power consumed in association with transferring the data by throttling the I/O bus.

Embodiments of the present disclosure can provide benefits such as improved power management as compared to prior power management techniques. Power is consumed by various components of electronic systems (e.g., systems comprising SSDs). In many instances, a large portion of system power is consumed to operate a number of processors (e.g., a number of host processors and/or embedded processors of a controller). For instance, power is consumed by bus and/or interface circuitry in association with transferring data (e.g., user data, control data, address data etc) between a host and an SSD (e.g., via an I/O bus configured to couple the host to a host interface of the SSD). Power is also consumed by bus and/or interface circuitry in association with transferring data between an SSD controller and a memory (e.g., a number of memory devices, such as NAND dies). Also, power is consumed by the memory devices (e.g., in association with executing commands provided by the SSD controller).

The amount of power consumed in association with memory I/O (e.g., transfer of data between the memory and the controller) and/or in association with data transfer between the host and the controller can depend on various factors such as the interface type supporting the bus and/or the driver circuitry used to transfer data via the signal lines of the bus, among other factors. For instance, different interface standards (e.g., DDR, DDR2, DDR3, etc.) are capable of supporting different data transfer rates (e.g., bus speeds) and may operate at different supply voltages, which can affect the I/O power consumption. Also, drivers may operate at different supply voltages and may or may not be capable of supporting the particular transfer rate capabilities of different memory interfaces. As an example, LVCMOS (low voltage CMOS) drivers may consume relatively low power as compared to drivers employing a stub series terminated logic (SSTL) standard, for instance. However, LVCMOS drivers may not be capable of supporting data transfer rates as high as those supported by SSTL drivers.

In general, the power consumption associated with memory I/O increases as the data transfer rate capabilities increase. The increased power consumption can be due to interface circuitry such as on die termination (ODT) logic, which may be used to maintain signal integrity of the I/O bus at increased data transfer rates. In some instances, I/O power consumption (e.g., power dissipated in transferring data between the controller and the memory devices) may reach 50% or more of the total power consumption of an SSD. A number of embodiments of the present disclosure manage power consumption of an electronic system by throttling the I/O bus. Unlike in previous power management approaches, a number of embodiments of the present disclosure include throttling the I/O bus without adjusting a frequency of a clock signal associated with transferring the data and without adjusting a supply voltage of the controller (e.g., without employing a DVFS technique).

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "M" and "N", particularly with respect to reference numerals in the drawings, indicate that a number of the particular feature so designated can be included with a number of embodiments of the present disclosure. As used herein, "a number of" something can refer to one or more of such things.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

FIG. 1 is a block diagram of an apparatus in the form of a computing system 101 including at least one memory system 104 in accordance a number of embodiments of the present disclosure. As used herein, a memory system 104, a controller 108, or a memory device 110 might also be separately considered an "apparatus". The memory system 104 can be a solid state drive (SSD), for instance, and can include a host interface 106, a controller 108 (e.g., a processor and/or other control circuitry), and a number of memory devices 110-1, . . . , 110-M (e.g., solid state memory devices such as NAND flash devices), which provide a storage volume for the memory system 104. In a number of embodiments, the controller 108, a memory device 110-1 to 110-M, and/or the host interface 106 can be physically located on a single die or within a single package (e.g., a managed NAND application). Also, in a number of embodiments, a memory (e.g., memory devices 110-1 to 110-M) can include a single memory device. In this example, each of the memory devices 110-1 to 110-M corresponds to a respective memory channel (e.g., CHANNEL 1 MEMORY, . . . , CHANNEL M MEMORY), which can comprise a group of memory devices (e.g., dies or chips); however, embodiments are not so limited.

As illustrated in FIG. 1, the controller 108 can be coupled to the host interface 106 and to the memory devices 110-1, . . . , 110-M via a respective number of I/O busses 113-1, . . . , 113-M. The host interface 106 can be used to transfer data between the memory system 104 and a host 102. The interface 106 can be in the form of a standardized interface. For example, when the memory system 104 is used for data storage in a computing system 101, the interface 106 can be a serial advanced technology attachment (SATA), a serial attached SCSI (SAS), a peripheral component interconnect express (PCIe), or a universal serial bus (USB), among other connectors and interfaces. In general, however, interface 106 can provide an interface for passing control, address, data, and other signals between the memory system 104 and a host 102 having compatible receptors for the interface 106. Although not shown in FIG. 1, the host interface can include a host bus interface (HBA), which can be coupled to the host 102 via a number of I/O busses, which can be represented by the arrow between the host 102 and interface 106.

Host 102 can be a host system such as a personal laptop computer, a desktop computer, a digital camera, a mobile telephone, or a memory card reader, among various other types of hosts. Host 102 can include a system motherboard and/or backplane and can include a number of memory access devices (e.g., a number of processors).

In the example shown in FIG. 1, each bus 113-1, . . . , 113-M is associated with a respective memory channel; however, embodiments are not limited to this configuration. For instance, in a number of embodiments, a single I/O bus can support multiple channels. The I/O busses 113-1 to 113-M can comprise a number of signal lines (e.g., data lines, address lines, control lines, etc.). The controller 108 includes memory interface 112 used to couple the I/O busses 113-1 to 113-M to respective memory devices 110-1 to 110-M (e.g., via corresponding interfaces 114-1 to 114-M). The memory interfaces 112 and/or 114-1 to 114-M can provide physical connections for the signal lines of the busses 113-1 to 113-M and can comprise various components such as driver circuitry (e.g., SSTL drivers, LVCMOS drivers, etc.) and/or ODT circuitry, for instance. The interfaces 112 and/or 114-1 to 114-M may support various signaling standards such as DDR, DDR2, and/or DDR3, among other signaling standards. As an example, the interfaces 112 and 114 and I/O busses 113 can comply with an Open Nand Flash Interface (ONFI).

The controller 108 can communicate with the memory (e.g., memory devices 110-1 to 110-M) to control data read, write, and erase operations, among other operations. The controller 108 can include, for example, a number of components in the form of hardware and/or firmware (e.g., one or more integrated circuits) and/or software for controlling access to the memory and/or for facilitating data transfer between the host 102 and memory. In the example illustrated in FIG. 1, the controller 108 includes a power manager 116 used to manage power in accordance with embodiments described herein. However, the controller 108 can include various other components not illustrated so as not to obscure embodiments of the present disclosure. Also, although power manager 116 is illustrated as resident on the controller 108, in some embodiments, the power manager 116 may reside elsewhere in the system 101 (e.g., as an independent component or resident on a different component of the system). The power manager 116 can be implemented in hardware and/or firmware, for example, and can throttle power in accordance with a number of different power modes. For instance, the power modes can be based on characteristics such as data priority levels (e.g., whether the data is high priority data, low priority data, garbage collection data, etc.), write amplification associated with the SSD, application type (e.g., some applications may require lower I/O bandwidth than others), and/or programming type (e.g., whether a page of data to be written is a lower page or an upper page), among other characteristics. Also, in a number of embodiments, the power manager can be used to throttle an I/O bus between the host 102 and controller 108.

The memory (e.g., memory devices 110-1 to 110-M) can include a number of arrays of memory cells. The arrays can be flash arrays with a NAND architecture, for example. However, embodiments are not limited to a particular type of memory array or array architecture. The memory cells can be grouped, for instance, into a number of blocks including a number of physical pages. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

In embodiments in which the memory devices 110-1 to 110-M comprise flash arrays having a NAND architecture, the arrays can comprise access lines, e.g., word lines and intersecting data lines, e.g., bit lines. The arrays can comprise "strings" of memory cells connected in series source to drain between a source select gate configured to selectively couple a respective string to a common source and a drain select gate configured to selectively couple a respective string to a respective bit line. The memory cells can comprise, for instance, a source, a drain, a charge storage structure (e.g., a floating gate), and a control gate, with the control gates of cells corresponding to a "row" of cells being commonly coupled to a word line. A NOR flash array would be similarly structured with the exception of strings of memory cells being coupled in parallel between select gates.

As described further herein, in a number of embodiments of the present disclosure, a power manager (e.g., power manager 116) can be configured to adjust I/O power consumption associated with transferring data between a controller (e.g., controller 108) and a number of memory devices (e.g., 110-1 to 110-M) by throttling a number of I/O busses (e.g., 113-1 to 113-M) without adjusting a transfer rate of the number of I/O busses.

FIG. 2 is a timing diagram associated with power management in accordance with a number of embodiments of the present disclosure. The timing diagram illustrates transfer times 222-1 to 222-8 associated with transferring an amount of data (e.g. a number of pages) from a controller (e.g., controller 108) to a memory (e.g., memory devices 110-1 to 110-M) via a number of I/O busses 213-1 to 213-8 corresponding to a respective number of memory channels, as well as respective programming times 224-1 to 224-8 associated with programming the transferred data to the memory (e.g., responsive to a host command). The busses 213-1 to 213-8 can be analogous to busses 113-1 to 113-M described above in connection with FIG. 1. As shown in FIG. 2, the busses 213-1 and 213-8 are associated with LVCMOS circuitry 225 (e.g., drivers associated with interface circuitry such as interface circuitry 112 and/or 114 shown in FIG. 1) capable of supporting a data transfer rate of 200 MT/s (megatransfers/second). Embodiments are not limited to this example.

In the example illustrated in FIG. 2, the transfer times 222-1 to 222-8 associated with the respective I/O busses 213-1 to 213-8 are equal and are the same as an available transfer time 220 associated with a programming operation. The available transfer time 220 can be, for instance, a maximum time allotted for data transfer in association with a programming operation. As an example, the available transfer time 220 may be determined based on the size of a number of pages of data. As described further herein, in a number of embodiments, a power manager (e.g., 116) can be used to throttle a number of the I/O busses 213-1 to 213-8 by adjusting the transfer times 222-1 to 222-8. For instance, in a number of embodiments, the transfer times 222-1 to 222-8 can be reduced (e.g., by transferring data for less than the available transfer time 220) such that less power is consumed in association with transferring data between a controller and a memory. As an example, the I/O busses 213-1 to 213-8 can be throttled such that data is transferred for only a fraction (e.g., 25%, 33%, 50%, 75%, etc.) of the available transfer time 220 such that a fraction of the available bandwidth of the busses is used. That is, time division can be employed in association with the transfer times 222-1 to 222-8 corresponding to the busses 213-1 to 213-8. In a number of embodiments, the I/O busses 213-1 to 213-8 can be throttled on a bus by bus basis such that different I/O busses can have different transfer times associated therewith (e.g., while maintaining a same data transfer rate).

As such, a number of embodiments can include adjusting (e.g., varying) the transfer times (e.g., 222-1 to 222-8) of I/O busses (e.g., 213-1 to 213-8) in association with transferring data between a controller and a memory (e.g., in association with a programming operation) in order to adjust the power consumed by the I/O busses and related interface circuitry during the transfer. It may be beneficial to adjust (e.g., reduce or increase) the power consumed in association with I/O transfers between the controller and memory at various times (e.g., based on changes in host activity or changes in activity of other system components that may affect the amount of power consumed by the system). For instance, it may be beneficial to reduce the I/O power consumption during periods when a host is consuming relatively high amounts of power (e.g., due to increased host activity such as during times of increased host commands and/or requests). Since the power consumed in association with data transfer via the I/O busses can be a significant portion of the total power consumed by a system, throttling the I/O busses can be a useful way to manage system power consumption (e.g., in order to conserve battery life).

In a number of embodiments, an I/O bus (e.g., 213-1 to 213-8) can be throttled without adjusting a frequency of a clock signal associated with transferring data. That is, in contrast to some previous approaches, such as DFS techniques, in which a clock signal frequency is adjusted (e.g., reduced) to manage system power consumption (e.g., by reducing the data transfer rate), a number of embodiments of the present disclosure manage system power by throttling I/O busses while maintaining the data transfer rate associated with the busses. For instance, in the example in FIG. 2, the 200 MT/s data transfer rate supported by the LVCMOS circuitry 225 can be maintained while throttling the I/O busses 213-1 to 213-8 in accordance with embodiments described herein.

A number of embodiments of the present disclosure can also include throttling an I/O bus (e.g., 213-1 to 213-8) without adjusting a supply voltage of the controller, in contrast to some previous approaches, such as DVS techniques, in which a supply voltage is adjusted (e.g., reduced) to manage system power consumption. Adjusting a supply voltage can affect the data transfer rate supported by the I/O busses and/or interface circuitry associated therewith.

FIG. 3 is a timing diagram illustrating power management associated with a number of I/O busses in accordance with a number of embodiments of the present disclosure. The timing diagram illustrates transfer times 322-1 to 322-8 associated with transferring an amount of data (e.g. a number of pages) from a controller (e.g., controller 108) to a memory (e.g., memory devices 110-1 to 110-M) via a number of I/O busses 313-1 to 313-8 corresponding to a respective number of memory channels, as well as respective programming times 324-1 to 324-8 associated with programming the transferred data to the memory (e.g., responsive to a host command). The busses 313-1 to 313-8 can be analogous to busses 113-1 to 113-M described above in connection with FIG. 1. As shown in FIG. 3, the busses 313-1 and 313-8 are associated with SSTL circuitry 325 (e.g., drivers associated with interface circuitry such as interface circuitry 112 and/or 114 shown in FIG. 1) capable of supporting a data transfer rate of 800 MT/s. Embodiments are not limited to this example. In a number of embodiments, ODT may be used to help ensure signal integrity of data transfer via busses 313-1 to 313-8 at the particular data transfer rate.

In the example illustrated in FIG. 3, the transfer times 322-1 to 322-8 associated with the respective I/O busses 313-1 to 313-8 are equal and are less than the available transfer time 320 associated with a programming operation. As described further herein, in a number of embodiments (e.g., as described below in connection with FIGS. 4 and 5), a power manager (e.g., 116) can be used to throttle a number of the I/O busses 313-1 to 313-8 by adjusting the transfer times 322-1 to 322-8. For instance, in a number of embodiments, the transfer times 322-1 to 322-8 can be reduced (e.g., by transferring data for less than the available transfer time 320) such that less power is consumed in association with transferring data between a controller and a memory. As an example, the I/O busses 313-1 to 313-8 can be throttled such that data is transferred for only a fraction (e.g., 25%, 33%, 50%, 75%, etc.) of the available transfer time 320 such that a fraction of the available bandwidth of the busses is used. That is, time division can be employed in association with the transfer times 322-1 to 322-8 corresponding to the busses 313-1 to 313-8. In the example shown in FIG. 3, the busses 313-1 to 313-8 are throttled such that data is transferred for about 25% of the available transfer time 320. In a number of embodiments, the I/O busses 313-1 to 313-8 can be throttled on a bus by bus basis such that different I/O busses can have different transfer times associated therewith (e.g., while maintaining a same data transfer rate).

As described above, in a number of embodiments, an I/O bus (e.g., 313-1 to 313-8) can be throttled without adjusting a frequency of a clock signal associated with transferring data and/or without adjusting a supply voltage of the controller, while maintaining the data transfer rate associated with the busses. For instance, in the example in FIG. 3, the 800 MT/s data transfer rate supported by the SSTL circuitry 325 can be maintained while throttling the I/O busses 313-1 to 313-8 in accordance with embodiments described herein. Embodiments are not limited to a particular I/O bus topology and/or data transfer rate supported thereby. For instance, embodiments of the present disclosure can be applicable to I/O bus and associated interface circuitry supporting data rates higher than 800 MT/s and/or lower than 200 MT/s.

Figure 4:
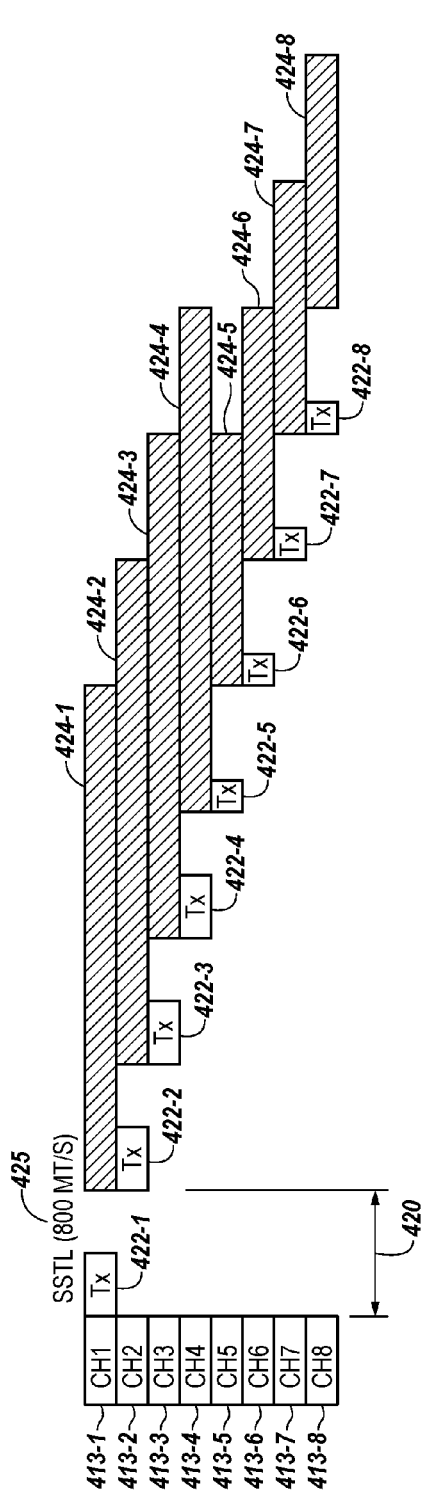
FIG. 4 is a timing diagram associated with power management in accordance with a number of embodiments of the present disclosure.

FIG. 4 is a timing diagram associated with power management in accordance with a number of embodiments of the present disclosure. The timing diagram illustrates transfer times 422-1 to 422-8 associated with transferring an amount of data (e.g. a number of pages) from a controller (e.g., controller 108) to a memory (e.g., memory devices 110-1 to 110-M) via a number of I/O busses 413-1 to 413-8 corresponding to a respective number of memory channels, as well as respective programming times 424-1 to 424-8 associated with programming the transferred data to the memory (e.g., responsive to a host command).

The busses 413-1 to 413-8 of FIG. 4 are the same as busses 313-1 to 313-8 of FIG. 3. For instance, the busses 413-1 and 413-8 are associated with SSTL circuitry 425 (e.g., drivers associated with interface circuitry such as interface circuitry 112 and/or 114 shown in FIG. 1) capable of supporting a data transfer rate of 800 MT/s. However, in the example illustrated in FIG. 4, the busses 413-1 to 413-8 are throttled in a different manner than busses 313-1 to 313-8 of the example shown in FIG. 3. For instance, the busses 413-1 to 413-8 are throttled differently (e.g., on a bus by bus basis) such that the transfer times 422-1 to 422-8 associated with the respective I/O busses 413-1 to 413-8 are not equal. In the example illustrated in FIG. 4, the busses 413-1 to 413-4 corresponding to respective channels 1 to 4 are throttled such that their respective transfer times 422-1 to 422-4 are about half of the available transfer time 420 associated with a programming operation (e.g., the busses are throttled such that about 50% of the available bandwidth is used). Also, the busses 413-5 to 413-8 corresponding to respective channels 1 to 4 are throttled such that their respective transfer times 422-5 to 422-8 are about a quarter of the available transfer time 420 (e.g., the busses are throttled such that about 25% of the available bandwidth is used). Since the transfer times 422-1 to 422-4 are longer than the transfer times 422-5 to 422-8, more data is transferred by busses 413-1 to 413-4 during respective transfer times 422-1 to 422-4 than by busses 413-5 to 413-8 during respective transfer times 422-5 to 422-8. Hence, more power is consumed by data transfer via busses 413-1 to 413-4 than by data transfer via busses 413-5 to 413-8, in this example.

Embodiments are not limited to this example. For instance, in a number of embodiments, a power manager (e.g., 116) can be used to throttle the I/O busses 413-1 to 413-8 by adjusting the transfer times 422-1 to 422-8 (e.g., in order to change the amount of power consumed in association with I/O transfers between the controller and the memory). As described above, in a number of embodiments, the I/O busses 413-1 to 413-8 can be throttled without adjusting a frequency of a clock signal associated with transferring data and/or without adjusting a supply voltage of the controller, while maintaining the data transfer rate associated with the busses. For instance, in the example in FIG. 4, the 800 MT/s data transfer rate supported by the SSTL circuitry 425 can be maintained while throttling the I/O busses 413-1 to 413-8 in accordance with embodiments described herein.

Figure 5:
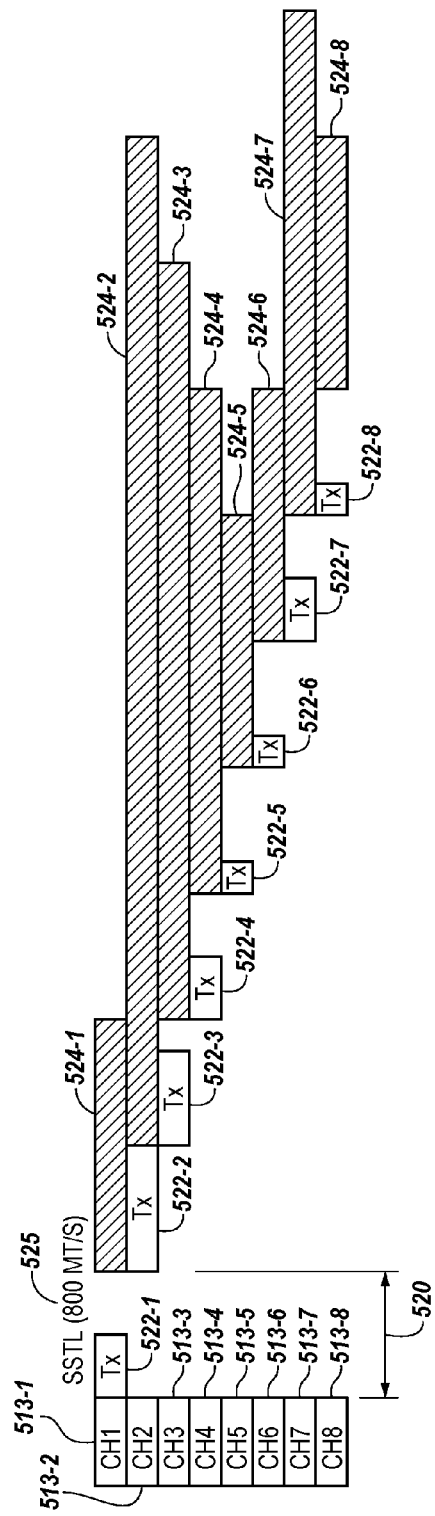
FIG. 5 is a timing diagram associated with power management in accordance with a number of embodiments of the present disclosure.

FIG. 5 is a timing diagram associated with power management in accordance with a number of embodiments of the present disclosure. The timing diagram illustrates transfer times 522-1 to 522-8 associated with transferring an amount of data (e.g. a number of pages) from a controller (e.g., controller 108) to a memory (e.g., memory devices 110-1 to 110-M) via a number of I/O busses 513-1 to 513-8 corresponding to a respective number of memory channels, as well as respective programming times 524-1 to 524-8 associated with programming the transferred data to the memory (e.g., responsive to a host command).

The busses 513-1 to 513-8 of FIG. 5 are the same as busses 313-1 to 313-8 of FIG. 3 and busses 413-1 to 413-8 of FIG. 4. For instance, the busses 513-1 and 513-8 are associated with SSTL circuitry 525 (e.g., drivers associated with interface circuitry such as interface circuitry 112 and/or 114 shown in FIG. 1) capable of supporting a data transfer rate of 800 MT/s. However, in the example illustrated in FIG. 5, the busses 513-1 to 513-8 are throttled in a different manner than the busses of FIGS. 3 and 4. For instance, in this example, the busses 513-1 to 513-8 are throttled on a bus by bus basis in a different manner than the throttling illustrated in FIG. 4.

In the example illustrated in FIG. 5, the busses 513-1, 513-5, 513-6, and 513-8 are throttled such that their respective transfer times 522-1, 522-5, 522-6, and 522-8 are about one quarter of the available transfer time 520 associated with a programming operation (e.g., the busses are throttled such that about 25% of the available bandwidth is used). The busses 513-4 and 513-7 are throttled such that their respective transfer times 522-4 and 522-7 are about half of the available transfer time 520 (e.g., the busses are throttled such that about 50% of the available bandwidth is used). In this example, bus 513-3 is throttled such that the transfer time 522-3 is about three quarters of the available transfer time 520 (e.g., about 75% of the available bandwidth is used), and bus 513-2 is throttled such that the transfer time 522-2 is equal to the available transfer time 520 (e.g., 100% of the available bandwidth is used).

As such, the power consumed by bus 513-2 is greater than the power consumed by bus 513-3, which is greater than the power consumed by busses 513-4 and 513-7, which is greater than the power consumed by busses 513-1, 513-5, 513-6, and 513-8. Embodiments are not limited to the example shown in FIG. 5.

CONCLUSION

The present disclosure includes methods and apparatuses for power management. One method includes transferring data via an input/output (I/O) bus, and adjusting an amount of power consumed in association with transferring the data by throttling the I/O bus.

As used herein, the term "and/or" includes any and all combinations of a number of the associated listed items. As used herein the term "or," unless otherwise noted, means logically inclusive or. That is, "A or B" can include (only A), (only B), or (both A and B). In other words, "A or B" can mean "A and/or B" or "a number of A and B."

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for power management, comprising:
performing a number of memory operations that includes transferring data via a number of input/output (I/O) busses between a controller and a memory device, wherein the I/O busses are configured to transfer data at a same transfer rate, and wherein a particular transfer time is allotted for transferring a particular amount of data in association with performing the memory operation, and wherein the particular transfer time is determined based on a size of a page of data; and
throttling the number of I/O busses in association with performing the number of memory operations without throttling at least one of: a clock signal associated with the I/O bus, and a supply voltage of the controller;
wherein throttling the number of I/O busses includes throttling the number of I/O busses on a bus by bus basis such that:
at least one of the number of busses consumes more power in association with transferring data than at least one other of the number of busses consumes in association with transferring data while maintaining the same transfer rate; and
the at least one other of the number of I/O busses consumes less power by transferring data for an amount of time less than the particular transfer time allotted for transferring the particular amount of data, while maintaining the same transfer rate, such that an amount of data less than the particular amount of data is transferred during the particular transfer time.

2. The method of claim 1, wherein the controller is coupled to a host, and wherein the method further comprises adjusting an amount of power consumed in association with transferring an amount of data by throttling at least one of the number of I/O busses in response to a change in host activity.

3. The method of claim 1, wherein throttling the number of I/O busses without throttling the clock signal associated with the number of I/O busses includes throttling the number of I/O busses without adjusting a frequency of the clock signal associated with transferring the data.

4. The method of claim 1, wherein the method includes transferring data via the number of I/O busses utilizing a stub series terminated logic (SSTL).

5. The method of claim 1, wherein the particular transfer time is a maximum time allotted for transferring data in association with the memory operation.

6. The method of claim 1, wherein transferring data via the number of I/O busses at the particular transfer rate and for an amount of time less than the particular transfer time allotted comprises transferring at least a portion of the particular amount of data during the particular transfer time.

7. The method of claim 1, including transferring data via the number of I/O busses in association with executing a host command.

8. The method of claim 1, wherein the memory device includes a plurality of groups of memory devices with each group corresponding to a channel and coupled to the controller via one of a respective plurality of I/O busses, and wherein the method includes adjusting power consumed in association with transferring data between the controller and the memory via the respective plurality of I/O busses on a bus by bus basis.

9. The method of claim 1, wherein transferring data comprises transferring data between a host and a controller via the number of I/O busses.

10. The method of claim 1, wherein the method includes performing on die termination via interface circuitry coupled to the number of I/O busses.

11. An apparatus, comprising:
a number of input/output (I/O) busses between a controller and a number of memory devices, wherein the number of I/O busses are configured to transfer data at a same particular transfer rate, and wherein a particular transfer time is allotted for transferring a particular amount of data in association with performing a memory operation, and wherein the particular transfer time allotted is determined based on a size of a page of data; and
a power manager comprising circuitry configured to throttle the number of I/O busses, without throttling at least one of: a clock signal associated with the number of I/O busses, and a supply voltage of the controller, in order to adjust an amount of power consumed by the apparatus in association with transferring data during the particular transfer time allotted for transferring the particular amount of data;
wherein throttling the number of I/O busses includes:
transferring data via a first bus of the number of I/O busses at the same particular transfer rate and for a first amount of time that is less than the particular transfer time allotted for transferring the particular amount of data such that an amount of data less than the particular amount of data is transferred during the particular transfer time; and
transferring data via a second bus of the number of I/O busses at the same particular transfer rate and for an amount of time greater than the first amount of time such that the second bus consumes more power in association with transferring data during the particular transfer time while maintaining the same particular transfer rate.

12. The apparatus of claim 11, wherein the apparatus further comprises a memory interface that comprises stub series terminated logic.

13. The apparatus of claim 11, wherein the apparatus includes:
a memory interface coupling a controller to the memory devices; and a host interface configured to couple the controller to a host, wherein the number of I/O busses comprises a number of I/O busses coupled between the controller and the memory interface and/or a number of I/O busses coupled between the controller and the host interface.

14. The apparatus of claim 11, wherein the memory interface comprises a plurality of LVCMOS (low voltage complementary metal oxide semiconductor) drivers.

15. The apparatus of claim 11, wherein the host interface comprises an interface selected from the group including:
a serial ATA (SATA) interface;
a PCIe interface; and
a serial attached SCSI (SAS) interface.

16. The apparatus of claim 11, wherein the power manager is configured to throttle the number of I/O busses in response to a change in host activity.

17. An apparatus, comprising:
a plurality of groups of memory devices each corresponding to one of a respective plurality of channels and coupled to a controller via one of a respective plurality of input/output (I/O) busses, wherein each of the respective plurality of I/O busses is configured to transfer data at a particular transfer rate, and wherein a particular transfer time is allotted for transferring a particular amount of data associated with a memory operation at a transfer rate of the corresponding I/O bus; and
a power manager comprising circuitry configured to adjust I/O power consumption associated with the data transfer associated with performing the memory operation between the controller and the plurality of groups of memory devices by throttling the plurality of I/O busses without throttling at least one of: a clock signal associated with the I/O bus, and a supply voltage of the controller,
wherein throttling the plurality of I/O busses includes:
transferring data via a first bus of the plurality of I/O busses at the particular transfer rate and for a first amount of time less than the particular transfer time allotted for transferring the particular amount of data such that an amount of data less than the particular amount of data is transferred during the particular transfer time; and
transferring data via a second bus of the plurality of I/O busses at the particular transfer rate and for a second amount of time less than the particular transfer time allotted for transferring the particular amount of data such that the second bus consumes more power in association with transferring data during the particular transfer time while maintaining the same particular transfer rate, and wherein the second amount of time is greater than the first amount of time.

18. The apparatus of claim 17, wherein the apparatus comprises on die termination (ODT) circuitry associated with terminating signal lines of the plurality of I/O busses.

19. The apparatus of claim 17, including a host coupled to the controller via a host interface.

* * * * *